UNITED STATES PATENT OFFICE.

FREDRICK N. HERING, OF NEW YORK, N. Y., ASSIGNOR TO THOMAS HOWARD, OF NEW YORK, N. Y.

LUMINOUS COMPOSITION.

1,407,534.      Specification of Letters Patent.      Patented Feb. 21, 1922.

No Drawing.     Application filed September 15, 1919. Serial No. 323,806.

*To all whom it may concern:*

Be it known that I, FREDRICK N. HERING, a citizen of the United States, and resident of the city of New York, in the county of New York and State of New York, have invented certain new and useful Improvements in Luminous Composition, of which the following is a specification.

This invention has as one of its objects to provide a compound having luminous or radio-active properties, capable of being intensified or revitalized by exposure to actinic rays, as from the sun or a powerful artificial light.

Another object is to provide means, in the form of tenaciously adherent liquids, by which the compound may be applied in the manner of paint.

A further object is to blend with the mass, coloring matter whereby any of the lighter tints or shades of color may be obtained.

The compound consists of a mixture of certain hereinafter named mineral salts and chemicals, each in a relatively pure, dry and finely pulverized state.

In preparing the compound the ingredients are mixed in substantially the following quantities by weight:

```
.55 per cent calcium sulphide, luminous.
.18   "    "   zinc sulphide.
.09   "    "   barium sulphide.
.09   "    "   zinc sulphate.
.09   "    "   calcium carbonate.
────
1.00
```

These several powdered substances are each of them ordinary commercial commodities, purchasable in chemical supply houses, their source and derivation being well known to the trade and not a part of this invention. The powders are thoroughly mixed, blended and commingled by agitation, sifting and like mechanical means in a perfectly dry, cool condition, no artificial heat being used at any stage in the production of the compound which consists of a white odorless mass from which emanate clearly perceptible violet colored rays.

After mixing, the mass is exposed in shallow pans to the direct rays of the sun or a powerful artificial light for approximately three hours, when it is in condition to mix with a liquid used merely as a convenient vehicle, acting as a binder or adhesive by which the compound can be applied as a paint, the proportion preferred being substantially one ounce of the compound to one pound of the liquid, but may be modified in accordance with the effects it is desired to produce.

This liquid is preferably a white enamel, as used for interior finish, adapted for quick drying, although Japan drier may be used, or in fact any ordinary oil paint with the exception of those containing lead; the compound may also be used in connection with any of the cold water mineral paints with good results.

Obviously pigments in powdered condition may be added to the compound in order to produce colors, particularly of light shades.

The compound when applied to surfaces adheres without peeling or cracking, producing a lustrous, glossy finish and is capable of omitting light for a considerable period of time and in sufficient volume for practical purposes.

These surfaces must be exposed for a variable period of time to the action of light, the length of exposure being proportionate to the strength of the light, and for bright sun light about three hours.

As an instance, the interior of closets in which no natural or artificial light enters when closed, having had its walls painted with the compound, and exposed to a bright light for a suitable period of time, has sufficient luminosity to enable ordinary plain print to be read and when the luminous property of the compound becomes diminished it is quickly and entirely recuperated by subjecting the painted surfaces to the effect of a powerful light for a brief period of time and such restorations may be repeated indefinitely as required, the light emanating properties not appreciably becoming exhausted. These several substances when mixed with ordinary white paints of zinc foundation, enables the paint to give better reflection of light, due to the peculiar qualities the composition has of absorption and later of reflection.

I am aware that certain constituents of the compound are known to possess actinic properties, and have been used for like purposes, but in the combination as presented, the process of mixing and the manner of its application together with revivication is believed to be new and constitute an advance in the art, therefore what I claim is:—

1. A composition adapted to produce a luminous effect, comprising zinc sulphate and sulphide, calcium carbonate and sulphide and barium sulphide, all intimately mixed in powdered form.

2. A composition adapted to produce a luminous effect comprising luminous calcium sulphide, fifty-five parts by weight, zinc sulphide eighteen parts, barium sulphide nine parts, zinc sulphate nine parts and calcium carbonate nine parts.

3. A composition adapted to produce a luminous effect comprising luminous calcium sulphide, essentially fifty-five parts by weight, zinc sulphide eighteen parts, barium sulphide nine parts, zinc sulphate nine parts and calcium carbonate nine parts, and a liquid vehicle by which the composition may be applied.

4. A composition adapted to produce a luminous effect comprising zinc sulphate and sulphide, calcium carbonate and sulphide, and barium sulphide, all intimately mixed in powdered form, and a liquid having adhesive and drying properties in which said substances are united as a vehicle for application, the proportion of said dry compound to said liquid being substantially one to sixteen parts by weight.

5. A composition comprising luminous sulfids in combination with an alkali earth metal carbonate, to form a composition adapted to produce a luminous effect.

6. A composition comprising luminous sulfids in combination with a zinc sulphate, to form a composition adapted to produce a luminous effect.

7. The process of producing luminous surfaces consisting of mixing zinc sulphate and sulphide, calcium carbonate and sulphide, and barium sulphide in a liquid, applying the mixture as a paint and exposing the coated surfaces initially and at intervals to light whereby the luminosity of the surfaces are revived.

8. The process of producing luminous surfaces consisting of mixing metallic salts having luminous properties, in a dry cool powdered condition, with a liquid vehicle having adhesive properties, applying the mixture as a paint, exposing the painted surfaces to actinic light rays either natural or artificial and repeating such exposure as may be required.

9. The process of producing luminous surfaces consisting of mixing metallic salts having luminous properties, in powdered form, then exposing to sunlight or strong artificial light for a number of hours and mixing approximately one ounce of the compound to approximately one pound of a liquid or pigment.

10. The process of producing luminous surfaces consisting of mixing metallic salts having luminous properties, in powdered form, then exposing to sunlight or strong artificial light for a number of hours, mixing approximately one ounce of the composition to approximately one pound of a liquid or pigment, and applying the mixture as a paint.

11. The process of producing luminous surfaces consisting of mixing metallic salts having luminous properties, in powdered form, then exposing to sunlight or strong artificial light for a number of hours, mixing approximately one ounce of the composition to approximately one pound of a liquid or pigment applying the mixture as a paint, and exposing the coated surface initially and at intervals to light whereby the luminosity of the surfaces are revived.

In testimony whereof I have signed my name to this specification.

FREDRICK N. HERING.